United States Patent [19]

Reddy

[11] 4,092,955
[45] June 6, 1978

[54] ROUGHNESS SENSOR
[75] Inventor: Junuthula N. Reddy, Troy, Mich.
[73] Assignee: The Bendix Corporation, Southfield, Mich.
[21] Appl. No.: 729,317
[22] Filed: Oct. 4, 1976
[51] Int. Cl.² .............................................. F02B 3/04
[52] U.S. Cl. ................................ 123/32 EA; 73/650; 123/148 E
[58] Field of Search .............. 123/32 EA, 148 E, 102, 123/117 D, 119 R, 32 AE, 106, 139 AW, 198 R; 235/150.2, 152, 183, 184, 150.21, 150.3, 153 R; 60/278, 279; 70/35, 116; 73/517 A, 70.1

[56] References Cited
U.S. PATENT DOCUMENTS

| 2,655,036 | 10/1953 | Chapman | 73/517 A |
|---|---|---|---|
| 3,722,614 | 3/1973 | Sakakibara et al. | 123/10 Z |
| 3,734,068 | 5/1973 | Reddy | 123/32 EA |
| 3,789,816 | 2/1974 | Taplin et al. | 123/139 AW |
| 3,955,723 | 5/1976 | Richards | 123/148 E |
| 4,044,234 | 8/1977 | Frobenius et al. | 123/32 EA |
| 4,044,235 | 8/1977 | Frobenius | 123/32 EA |
| 4,044,236 | 8/1977 | Bianchi et al. | 123/32 EA |

*Primary Examiner*—Charles J. Myhre
*Assistant Examiner*—R. A. Nelli
*Attorney, Agent, or Firm*—Gerald K. Flagg

[57] ABSTRACT

A roughness sensor for measuring cycle-to-cycle decreases in engine speed comprises engine-event responsive flip flop means for controlling the alternate store-up and subsequent count-down of contents into a first storage means simultaneously with the alternate count-down and the store-up of contents into a second storage means. The storage means feed respective first and second comparators that produce respective first and second output pulses the widths of which are determined by the interval between the time a corresponding storage means is counted down to its starting value and the time of the next flip flop transition. A raw roughness output pulse in the form of just one but not both or neither comparator output pulses is passed by exclusive OR logic means to a speed normalization means that also receives the contents of the storage means opposite to that producing the raw roughness pulse. The speed normalization means produces a speed normalized roughness signal having a magnitude varying inversely with the magnitude of just those contents of the opposite storage means counted up during the width of the raw roughness pulse.

12 Claims, 3 Drawing Figures

ROUGHNESS SENSOR

FIELD OF THE INVENTION

The present invention relates to roughness sensor means detecting and measuring cycle-to-cycle changes in engine speed to produce a roughness signal speed normalized for the instantaneous engine speed.

BACKGROUND OF THE INVENTION

Roughness sensors of the type disclosed in commonly-assigned U.S. Pat. Nos. 3,789,816 issued Feb. 5, 1974 to Taplin et al. on a "Lean Limit Internal Combustion Engine Roughness Control System," and 3,872,846, issued Mar. 25, 1975 to Taplin et al. on an "Exhaust Gas Recirculation Internal Combustion Engine Roughness Control System," the disclosures of such patents being hereby expressly incorporated herein by reference, provide a roughness signal the magnitude of which varies with changes in engine speed over many engine cycles and therefore lags the actual changes in engine speed. Moreover, such prior art sensors require filtering and differentiating of the speed signal to develop a roughness signal in the form of the first and/or higher order derivatives of speed. The differentiating was necessary to create a speed change signal and the filtering was necessary to separate out the driver-induced, and therefore slower varying, changes in engine speed. Finally, the roughness signals developed by the prior art reference sensors were not normalized for engine speed so that a roughness signal of a given magnitude at a low engine speed and a roughness signal of the same magnitude at a high engine speed causes a roughness utilization device to effect the same response. The prior art roughness sensors require consideration of engine-to-engine differences as well as engine noise and ambient conditions.

It is desirable to provide an engine roughness sensor that detects cycle-to-cycle changes in engine speed as might be produced by cycle-to-cycle changes in combustion pressures. It is also desirable to provide such a cycle-to-cycle roughness sensor that produces a cycle-to-cycle roughness signal for the fact that the same change in engine speed at a speed at a high engine speed and a low engine speeddoes not represent the same magnitude of engine roughness. It is furthermore desirable to provide a cycle-to-cycle engine roughness signal using a speed signal already generated for other closed-loop engine control purposes.

As further described in my commonly-assigned U.S. Pat. No. 3,734,068 issued on May 22, 1973 and entitled "Fuel Injection Control System," and other patents related thereto including U.S. Pat. No. 3,919,981 issued Nov. 18, 1975, the disclosures of each of said patents being expressly incorporated herein by reference, trigger pulses produced by a pair of distributor activated reed switches or by a signal induced from the ignition primary produce flip flop intervals varying inversely with engine speed. I have found that the difference between contiguous, immediately prior or subsequent, trigger pulses indicates changes in speed adequate for closedloop engine control purposes. Therefore the same trigger pulses may be used for roughness sensor purposes as are used in my aforementioned patents to correct the width of a fuel injection pulse for cycle-to-cycle changes in engine speed.

OBJECTS

It is therefore a primary object of the present invention to provide a new and improved engine roughness sensor.

It is another object of the present invention to provide an engine sensor responding to cycle-to-cycle changes in engine speed.

It is a further object of the present invention to provide a roughness sensor of the foregoing type that may be implemented by either analog or digital techniques.

It is a further object of the present invention to provide a roughness sensor of the foregoing type wherein the basic input signal to the roughness sensor is the same pulse signal utilized by a single and/or multi-point fuel injection system to control the width of the fuel injection pulse.

It is another primary object of the present invention to provide a roughness sensor producing a roughness signal that is normalized for actual engine speed.

SUMMARY OF THE INVENTION

A roughness sensor for measuring cycle-to-cycle decreases in engine speed comprises engine event responsive flip flop means for controlling the alternate store-up and subsequent count-down of contents into a first storage means simultaneously with the alternate countdown and the store-up of contents into a second storage means. The storage means feed respective first and second comparators that produce respective first and second output output pulses the widths of which are determined by the interval between the time a corresponding storage means is counted down to its starting value and the time of the next flip flop transition. A raw roughness output pulse in the form of just one but not both or neither comparator output pulses is passed by exclusive OR logic means to a speed normalization means that also receives the contents of the storage means opposite to that producing the raw roughness pulse. The speed normalization means produces a speed normalized roughness signal having a magnitude varying inversely with the magnitude of just those contents of the opposite storage means counted up during the width of the raw roughness pulse.

DESCRIPTION OF THE DRAWINGS

These and other objects and features of the present invention will become more apparent from the following description taken in conjunction with the following FIGURES wherein.

BLOCK DIAGRAM DESCRIPTION

Figure 1:
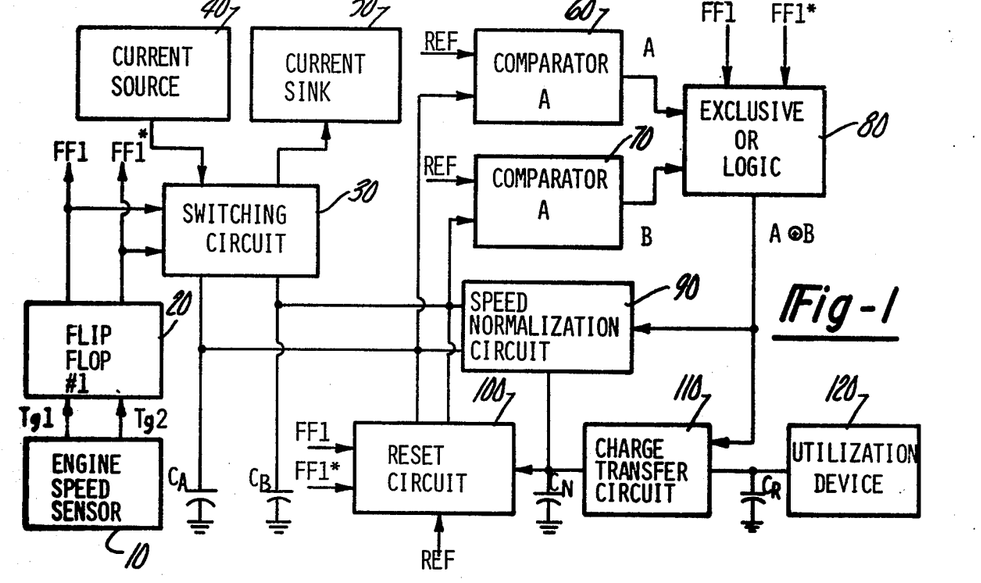
FIG. 1 is an illustration partially in block diagram form and partially in schematic of the roughness sensor of the present invention.
Figure 2:
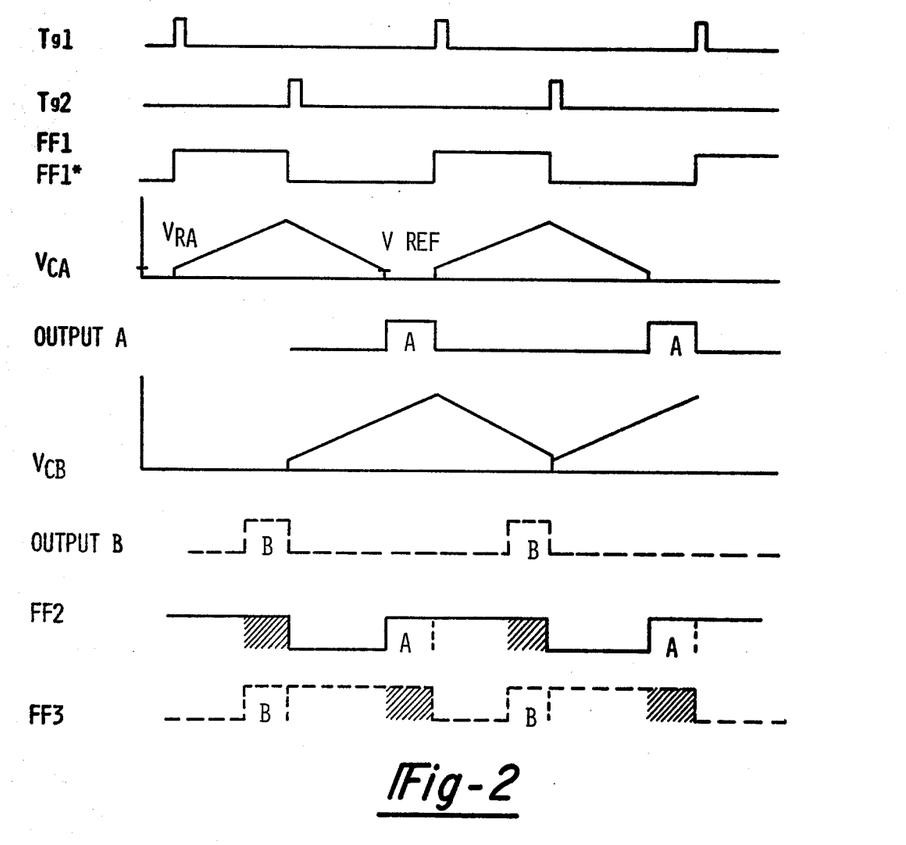
FIG. 2 illustrates the waveforms produced by certain of the elements shown in FIG. 1 and also the outputs of two flip flops FF2 and FF3 shown in FIG. 3.

Turning now to the block diagram of the invention shown in FIG. 1 and the waveforms produced in connection therewith shown in FIG. 2, there is shown a suitable engine speed sensor 10 in the form of an engine-crankshatt-driven trigger operated by, and comprising a part of, an otherwise conventional distributor. Pulse signals induced from the ignition primary could also be used. The engine speed sensor 10 generates trains of sequential engine-speed-dependent trigger pulses TG1 and TG2. These triggers pulses TG1 and TG2 are applied as inputs to a first flip flop 20 generating complementary outputs FF1 and FF1*, each such output having an interval or duration varying with the instantaneous engine speed.

The complementary outputs FF1 and FF1* of the first flip flop 20 are applied to control a switching circuit 30 so as to alternately connect a time-dependent count-up control in the form of a current source 40 to one of two content variable storage devices in the form of capacitors $C_A$ or $C_B$ while simultaneously connecting a time-dependent count-down control in the form of a current sink 50 to the other of the two capacitors $C_A$ or $C_B$. During a given FF1 interval, the switching circuit in this manner couples current source 40 to charge capacitor $C_A$ so as to generate a count-up or up-slope portion of voltage content $V_{CA}$ thereon starting from a reset level $V_{RA}$. Simultaneously, switching circuit 30 also couples current sink 50 to discharge capacitor $C_B$ so as to generate a count-down or down-slope portion of the voltage content $V_{CB}$ thereon. During the subsequent FF1* interval, switching circuit 30 couples current sink 50 to discharge capacitor $C_A$ so as to generate a count-down or down-slope portion of the voltage $V_{CA}$ thereon and to simultaneously couple current source 40 to charge capacitor $C_B$ to generate a count-up or up-slope portion of the voltage $V_{CB}$ thereon starting from a reset level $V_{RB}$.

The non-grounded terminal of capacitor $C_A$ is applied as one input to a first comparator 60, and the non-grounded terminal of capacitor $C_B$ is similarly applied as one input to a second comparator 70. A second input to each of the first and second comparators 60 and 70 is a reference voltage selected so that at constant engine speeds where the FF1 interval matches a contiguous FF1* interval the up-slope interval from a start or reset level to a peak value matches the down-slope interval from the peak value to the reverence level. In this manner the charging rate of the current source 40 may be selected to not necessarily match the discharge rate of current sink 50.

Each of the comparators 60 and 70 is operative to produce an output A or B respectively only as long as the voltage on the respective capacitors $C_A$ or $C_B$ is below the corresponding reference voltage, such reference-reset level therefore being selected to be suitably above the fully dicharged level of the capacitors. In this manner comparators 60 and 70 produce an output only when the engine is decelerating because then a given FF1 or FF1* interval is longer than the previous contiguous FF1* or FF1 interval. Under these conditions the charge or content stored on a particular capacitor $C_A$ or $C_B$ during the FF1 interval is discharged below the reference level prior to the end of the contiguous FF1* interval thereby leaving a duration prior to the reset of the capacitor corresponding to the duration A or B. On the other hand, if the engine is accelerating so that each FF1 or FF1* interval is shorter than the previous contiguous FF1* or FF1 interval, the charge contents stored on the capacitor $C_A$ or $C_B$ during the one FF1 interval is not discharged below the reference level during the contiguos FF1* interval, thereby preventing the respective comprator A or B from producing an output.

However, since the roughness sensor of the present invention is designed to sense engine roughness induced primarily by cycle-to-cycle decelerations and not driver-induced longer-term decelerations such as over 20 cycles or more, the outputs A and B of the comparators 60 and 70 are processed by an exclusive OR logic circuit 80 that determines the presence in contiguous intervals of just one or the other of the outputs A or B but not neither or both, such function also being known as the "Ring-OR" Function in view of the Boolean expression A⊕B having a ring around the Boolean + denoting the OR function.

The duration of an A or B output pulse passed by the exclusive-OR logic 80 is a raw measure of engine roughness. However, a given A or B duration at a low engine speed represents a greater roughness than the same A or B duration at a higher engine speed (i.e. an instantaneous deceleration of 30 RPM at 600 RPM is rougher than 30 RPM at 3000 RPM since the first is a 5% change and the second a 1% change). Therefore, the raw roughness A or B output is "normalized" for actual engine speed so that a given final roughness output at any speed represents roughly the same percentage of engine deceleration.

The normalization is effected by a speed normalization circuit 90 which charges a speed normalization capacitor $C_N$ for the duration of an A or B output pulse from exclusive-OR circuit 80 at a rate varying inversely with one of the ramp voltages $V_{CA}$ and $V_{CB}$ on capacitors $C_A$ and $C_B$. Since the magnitudes of such ramp voltages vary inversely with engine speed, speed normalization circuit 90 thereby effects a greater charge on speed normalization capacitor $C_N$ for a given A or B duration at higher engine speeds than lower engine speeds. In this manner the circuit approximates the equation [FF1-FF1*]/FF1, where [FF1-FF1:] represents the absolute difference between any two contiguous FF1 and FF1* intervals and FF1 (or FF1*) represents the duration of FF1 (or FF1*) corresonding to the FF1 interval in [FF1-FF1*].

Capacitors $C_A$, $C_B$ and $C_N$ are each coupled to a reset circuit 100, that is controlled by the complementary outputs FF1 and FF1* of flip flop 20 to reset each of the capacitors $C_A$, $C_B$ and $C_N$.

To preserve the charge stored on the speed normalizing capacitor for subsequent processing, a charged transfer circuit 120 is enabled by the duration or fall of the A or B output of the exclusive-OR logic circuit 80 to transfer the charge on the speed normalizing capacitor $C_N$ to a roughness storage capacitor $C_R$. The signal on roughness storage capacitor $C_R$ is applied to control a suitable engine control utilization device 120 such as an air-fuel ratio controller as disclosed in the above-cited Taplin '816 patent or an exhaust gas recirculation controller as disclosed in the above-cited Taplin '846 patent.

DETAILED DESCRIPTION OF OPERATION

Switching Circuit 30 — Current Source 40 — Current Sink 50

Figure 3:
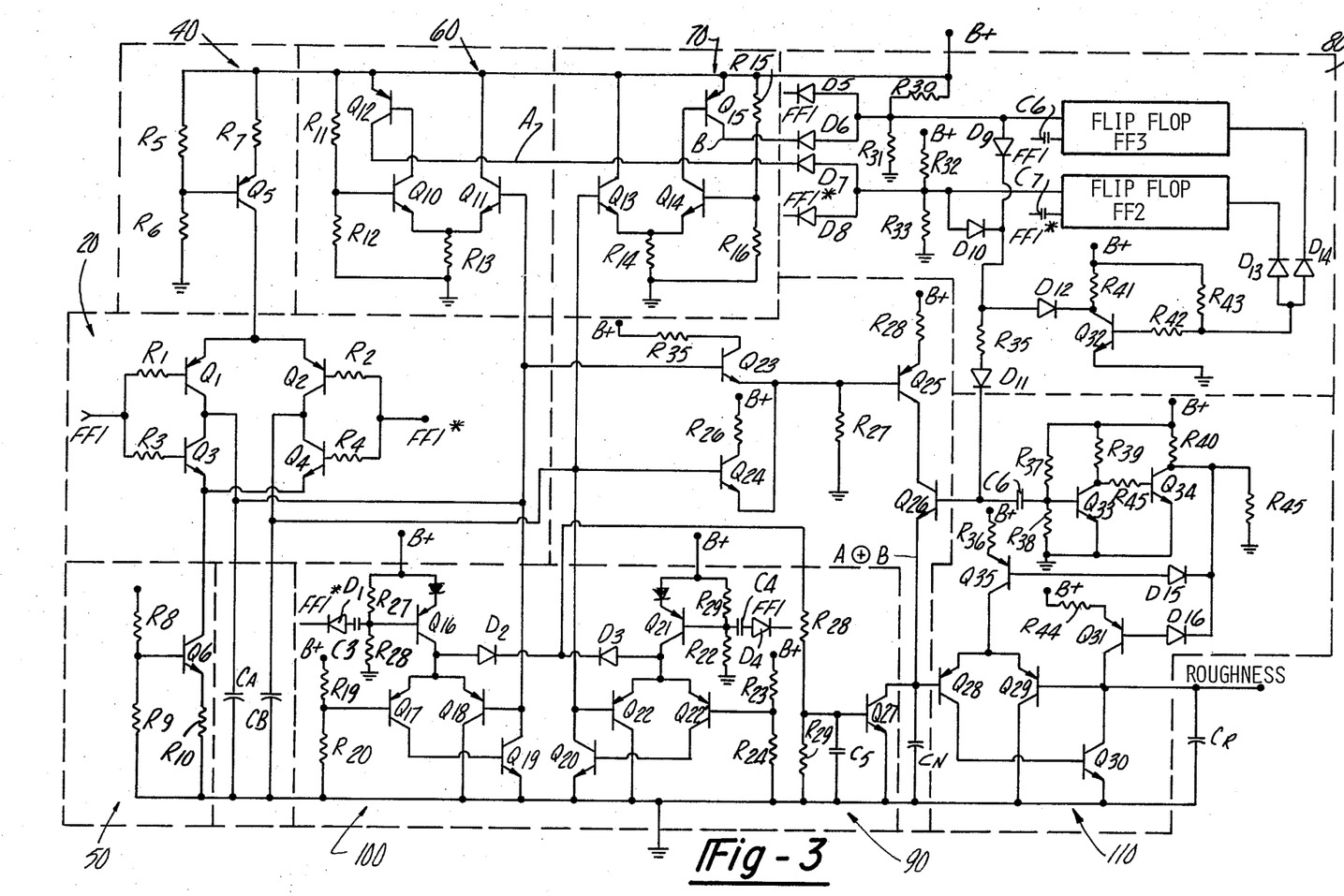
FIG. 3 is an electrical schematic of the roughness sensor of FIG. 1.

As may be better understood with reference to FIG. 3, switching circuit 30 comprises a pair of PNP transistors Q1 and Q2 and a pair of NPN transistors Q3 and Q4. The bases of transistors Q1 and Q3 are coupled to the FF1 output of flip flop 20 by a pair of coupling resistors R1 and R3 respectively, and the bases of transistors Q2 and Q4 are coupled to the FF1* output of flip flop 20 by a pair of coupling resistors R2 and R4 respectively. The collectors of transistors Q1 and Q3 are commonly connected to the non-grounded terminal of capacitor $C_A$, and the collectors of transistors Q2 and Q4 are commonly connected to the non-grounded terminal of capacitor $C_B$.

Current source 40 comprises a PNP transistor Q5 having a base commonly connected to the collectors of switching transistors Q1 and Q2. The emitter of current source transistor Q5 is coupled by a charge rate setting resistor R7 to a suitable source of B+, and the base of transistor Q5 is connected to the node of a pair of voltage dividing biasing resistors R5 and R6 coupled in series between B+ and ground.

Current sink 50 comprises an NPN transistor Q6 having a collector commonly connected to the emitters of switching transistors Q3 and Q4. The emitter of current sink transistor Q6 is grounded through a discharge-rate-setting resistor R10, and the Q6 base is connected to the node of a pair of base biasing voltage dividing resistors R8 and R9 coupled in series between B+ and ground.

With the assumed conditions that the FF1 output of flip flop 20 is initially HIGH so that the FF1* output thereof is LOW, transistor Q1 is OFF and Q3 is ON so that capacitor $C_A$ discharges through a path comprising the collector-to-emitter junction of transistor Q3, the collector-to-emitter junction of Q6, and the discharge rate setting transistor R10. Under the same initial conditions, transistor Q2 is ON and transistor Q4 if OFF so that capacitor $C_B$ is discharged through a path comprising the charge rate setting resistor R7, the emitter-to-collector junction of transistor Q5, and the emitter-to-collector junction of transistor Q2.

At the end of a given FF1 interval, the length or duration of which varies inversely with engine speed, flip flop 20 changes state so that the FF1 output thereof is LOW and the FF1* output thereof is HIGH. switching transistor Q1 is then turned ON and Q3 is turned OFF so that capacitor $C_A$ charges through a path comprising the charge rate setting resistor R7, the emitter-to-collector junction of Q5, and the emitter-to-collector junction of Q1. Simultaneously, capacitor $C_B$ discharges through a path comprising the collector-to-emitter junction of transistor Q4, the collector-to-emitter junction of Q6, and the discharge rate setting resistor R10.

So that the difference between the duration of a given FF1 or FF1* interval and a contiguous, either prior or subsequent, FF1* or FF1 interval may be determined, the time for increasing the charge on a given capacitor must be predetermined with respect to the time for decreasing the charge thereon for equal contiguous FF1 and FF1* intervals. In the present embodiment the components comprising current source 40 and current sink 50 are selected to effect charging and discharging currents of equal magnitudes to effect equal times, for equal contiguous FF1 and FF1* intervals, for charging a capacitor from a given reset level up to a maximum and back down to a corresponding comparator threshold reference level. It will of course be obvious to one skilled in the art that other means for effecting a predetermined relationship between the times for increasing and decreasing the charged content on a capacitor may be readily effected. For example the charging and discharging times may be equalized for unequal charging and discharging currents by accordingly varying the reset and/or threshold levels to effect the desired predetermined increasing and decreasing time relationship.

COMPARATORS 60 and 70

Comparators 60 and 70 are conventional devices each comprising a pair of differentially-connected transistors and an output transistor. Comparator 60 thus comprises a pair of NPN transistors Q10 and Q11, the emitters of which are commonly referenced to ground through a referencing resistor R13. The Q11 base is coupled to the non-grounded terminal of capacitor $C_A$, and the Q10 base is coupled to the node of a pair of voltage dividing reference resistors R11 and R12 coupled in series between B+ and ground. The Q10 collector is connected to the Q12 base, and the Q11 collector is connected to B+. Similarly for comparator 70, NPN transistors Q13 and Q14 are differentially connected to have their commonly connected emitters referenced to ground through a referencing resistor R14. The Q13 base is coupled to the non-grounded terminal of capacitor $C_B$, and the Q14 base is coupled to the node between voltage dividing referencing resistors R15 and R16 coupled in series between B+ and ground.

Comparators 60 and 70 operate so that NPN transistors Q10 and Q14, and therethrough PNP transistors Q12 and Q15, are turned ON to produce outputs A and B respectively at the Q12 and Q15 collectors only as long as the voltages $V_{CA}$ and $V_{CB}$ coupled from the capacitor $C_A$ and $C_B$ respectively to the Q11 and Q12 bases are BELOW the reference voltages coupled to the Q10 and Q14 bases respectively.

Since, in the illustrated embodiment of the invention, an A or a B output is produced only if a given FF1 or FF1* interval is greater than the immediately prior contiguous FF1* or FF1 interval, the circuit of the present embodiment determines whether or not the present interval is greater than the previous interval only at the end of the present interval. In other words, the only time that the current sink 50 discharges a capacitor $C_A$ or $C_B$ BELOW its respective reference voltage is towards the end of a respective FF1 or FF1* interval. This fact is employed by the exclusive-OR logic 80 in determining whether there is either an A output or a B output in respective contiguous FF1 and FF1* intervals, the circuitry precluding the A and B outputs from occurring in the same FF1 or FF1* interval.

Exclusive OR Logic Ciruit 80

The exclusive OR logic circuit 80 comprises second and third flip flops FF2 and FF3 coupled to various logic elements including three two-input AND gates and an output-disable switch. The three two-input AND gates comprise diodes D5 and D6, diodes D7 and D8, and diodes D13 and D14. The output disable switch comprises NPN transistor Q32.

The anodes of diodes D5 and D6 are commonly coupled to the set input of flip flop 3 and also to the nodes between the voltage dividing resistors R30 and R31 coupled in series between B+ and ground. Similarly, the anodes of diodes D7 and D8 are coupled to the set input of flip flop 2 and also to the node between voltage dividing resistors R32 and R33 connected in series between B+ and ground. The cathodes of diodes D5 and D8 are respectively coupled to the FF1 and FF1* outputs of flip flop 20, and the cathodes of diodes D7 and D6 are respectively coupled to the Q12 and Q15 collectors of comparators 60 and 70.

Flip flop 2 is set to produce a HIGH output by the concurrence of a FF1* output from flip flop 20 and an A output from comparator 60 and is reset by the transition of flip flop 20 from FF1 to FF1*, a capacitor C7 at the reset input of flip flop 2 differentiating the transition from FF1 to FF1* to produce a positive going spike resetting the flip flop. Similarly flip flop 3 is set by the concurrence of an FF1 output from flip flop 20 and a B output from comparator 70 and is reset by the transition of the output of flip flop 20 from FF1* to FF1, capacitor C6 at the reset input of flip flop 3 differentiating the transition to produce a positive spike at the reset input terminal.

The outputs of flip flops FF2 and FF3 are coupled to the cathodes of AND gate diodes D13 and D14, the anodes of which are commonly coupled by a coupling resistor R42 to the base of the output-disable switch NPN transistor Q32. The Q32 base is suitably biased with respect to B+ by a biasing resistor R41 so that when one or the other of the comparator outputs A or B are not present in contiguous FF1 and FF1* intervals, the bias otherwise provided to the Q32 base is removed through the LOW voltage source providing the LOW output at the corresponding flip flop 2 or 3 output.

However, when the engine undergoes a longer than cycle-to-cycle deceleration, comparators 60 and 70 produce their A and B outputs in contiguous FF1 and FF1* intervals. As has been just explained above with respect to the comparators 60 and 70, the A and B outputs thereof ar produced towards the end of the corresponding FF1 or FF1* intervals or towards the end of the downramp portion of the voltage generated on capacitor $C_A$ or $C_B$. Since capacitors C6 and C7 on the inputs to flip flops 3 and 2 cause these flip flops to be reset on the leading edge of an FF1 transition to FF1* or vice versa, the simultaneous occurrence of an A output on the Q12 collector with an FF1* sets flip flop 2 towards the end of a FF1* interval and allows FF2 to remain set throughout the subsequent FF1 interval until the transition to FF1*. Similarly, the simultaneous concurrence of an output B on the Q15 collector with an FF1 output from flip flop 20 sets flip flop 3 towards the end of an FF1 interval and allows FF3 to remain set during the subsequent FF1* interval until the transition to FF1.

As may be better understood with reference to the FIG. 2 waveforms excluding $V_{CB}$ which does not represent longer term deceleration but including the dotted output B and FF3 waveforms which do, the generation of an A and a B output in any two contiguous FF1 and FF1* intervals causes flip flops 2 and 3 to both produce HIGH outputs that overlap each other for the duration of the A and B outputs from comparators 60 and 70. During the intervals that the HIGH outputs of flip flops 2 and 3 overlap, the cathodes of AND gate diodes D13 and D14 are back biased to allow transistor Q32 to be biased ON through resistors 42 and 43. Q32 when ON inhibits the raw roughness transistor Q26 by grounding through the Q32 collector-to-emitter junction the A and B output pulses that would otherwise bias Q26 ON.

In this manner, the exclusive-OR logic circuit 80 functions to provide turn-on base bias in the form of an A or B output from comparators 60 or 70 only when one but not both nor neither of these outputs are present.

Speed Normalization Circuit 90

As has been explained above with reference to the waveforms of FIG. 2, the up-slope or count-up portions of the charge entered on capacitors $C_A$ and $C_B$ during the FF1 and FF1* intervals vary inversely with engine speed in the engine speed range of interest, 600 RPM – 3000 RPM. Moreover, comparators 60 and 70 generate the respective A and B output pulses towards the end of the respective FF1* and FF1 intervals. Thus, both the top-most region of the up-ramp portion of the voltage waveform $V_{CB}$ on capacitor $C_B$ and also the A output occur towards the end of the FF1* interval. Similarly, the upper-region of the up-ramp portion of the voltage waveform $V_{CA}$ on capacitor $C_A$ and also the B output occur towards the end of the FF1 interval. The speed normalization circuit 90 utilizes the fact that an A or B output corresponds with the upper regions of the up-ramp portion of a $V_{CB}$ or $V_{CA}$ waveform to vary with engine speed the charge entered on the speed normalizing capacitor $C_N$ during a given A or B output. To do this the speed normalization circuit 90 comprises a pair of NPN speed communicating transistors Q23 and Q24, a PNP variable-current source transistor Q25, an NPN raw roughness transistor Q26, and a speed normalization capacitor $C_N$.

The raw roughness transistor Q26 is saturated by, and for the duration of, an A or B output pulse generated at the Q12 or Q15 collectors of comparators 60 and 70 and communicated to the Q26 base through a resistor R35 and diode D11. A resistor R28 is connected in series with the Q25 emitter-to-collector junction and the Q26 collector-to-emitter junction between B+ and the non-grounded terminal of the speed normalizing capacitor $C_N$. The Q25 base is connected in common to the Q23 and Q24 emitters and is biased by the magnitudes of the currents passed by transistors Q23 and Q24 across a biasing resistor R27 connected between the Q25 base and ground. The voltages $V_{CA}$ and $V_{CB}$ are applied to the Q23 and Q24 bases respectively, and the resistors R25 and R26 respectively coupling the Q23 and Q24 collectors to B+ are selected to enable transistors Q23 and Q24 to operate in their linear regions over the magnitudes of the $V_{CA}$ and $V_{CB}$ voltages respectively coupled to the Q23 and Q24 bases. With transistors Q23 and Q24 so biased, conduction through one increases linearly at the same time that the conduction through the other decreases linearly until the latter is turned OFF during a corresponding A or B output when the corresponding down-ramp portion of the capacitor waveform is BELOW the comparator reference voltage. For example, transistor Q23 is OFF during an A output because then the down-ramp portion of the $V_{CA}$ waveform coupled to the Q23 base is by definition BELOW the reference voltage provided to comparator 60. Conversely transistor Q24 is ON, and the conduction therethrough increases, during the same A output interval. The increasing Q24 conduction increases the turn-off bias on the Q25 base reducing Q25 conduction and in turn reducing the charge entered on the speed normalizing capacitor $C_N$. In other words, since the Q24 conduction increases with decreasing engine speed, the Q25 conduction decreases with decreasing engine speed so that the charge entered on the speed normalizing capacitor $C_N$ during a given A output interval also decreases with decreasing engine speed.

Reset Circuit 100

Reset circuit 100 effects the reset of capacitors $C_A$ and $C_B$ once every corresponding FF1 or FF1* interval and also effects a reset of the speed normalizing capacitor $C_N$ in conjunction with every transition of flip flop 20. Speed normalizing capacitor $C_N$ is thus reset at twice the rate that capacitors $C_A$ and $C_B$ are reset.

Capacitor $C_A$ is reset through a selectively-enabled differential regulator in the form of a PNP current source transistor Q16, a pair of differentially-connected PNP transistors Q17 and Q18, and an NPN discharge transistor Q19. The current source transistor Q16 is normally biased OFF by the voltage coupled to the Q16 base from the node between voltage dividing resistors R17 and R18, themselves coupled in series between B+ and ground. The Q16 base is also coupled by a diode D1 and a capacitor C3 to the FF1* output of flip flop 20. Therefore, upon the transition of flip flop 20 from FF1* to FF1, capacitor C3 causes a negative going pulse to be applied to the Q16 base rendering Q16 momentarily ON and selectively enabling the differential pair Q17 and Q18. The Q17 collector is coupled to the Q19 base, and the Q17 base is coupled to the node between voltage dividing resistors R19 and R20, themselves coupled in series between B+ and ground. The Q18 base is coupled to both the non-grounded terminal of capacitor $C_A$ and the collector of transistor Q19, the base of which is grounded. When a FF1* to FF1 transition momentarily renders Q16 and in turn the Q17-Q18 pair ON, capacitor $C_A$ is discharged through the Q19 collector-to-emitter junction until the voltage $V_{CA}$ has decreased to the reset level existing at the node between the voltage dividing resistors R19 and R20.

Similarly, capacitor $C_B$ is reset by the circuitry comprising a current source transistor Q21, a differentially connected pair of PNP transistors Q22 and Q22', and an NPN discharge transistor Q20. Operating similarly to the circuit just described for resetting capacitor $C_A$, the transition of flip flop 20 from FF1 to FF1* causes capacitor C4 to couple a negative going pulse to the Q21 base to momentarily render Q21 ON and thereby selectively enabling differential pair Q22 and Q22'. Capacitor $C_B$ is then discharged through the Q20 collector-to-emitter junction until the voltage on capacitor $C_B$ has decreased to the reset voltage coupled to the Q23 base from the node between voltage dividing resistors R23 and R24, themselves coupled in series between B+ and ground.

Speed normalizing capacitor $C_N$ is reset through the collector-to-emitter junction of NPN discharge transistor Q27, the emitter of which is grounded. The Q27 base is connected to the node between voltage dividing resistors R28 and R29 coupled by diodes D2 and D3 in series between Q16 and Q21 collectors respectively. Since, as has just been described, a pulse is generated on the Q16 and Q21 collectors coincident with the transition of flip flop 20 from one of its FF1 and FF1* states to the other and since, as has been explained above with reference to the speed normalization circuit 90, a charge is entered on the speed normalizing capacitor $C_N$ only towards the end of each FF1 or FF1* interval, the reset of speed normalizing capacitor $C_N$ is delayed slightly beyond the end of an FF1 or FF1* interval in order to enable charge transfer circuit 110 to transfer whatever charge was stored on capacitor $C_N$ to roughness output capacitor $C_R$ for subsequent process and utilization by utilization device 120. The slight delay of the reset of speed normalizing capacitor $C_N$ beyond a transition of flip flop 20 is effected by capacitor C5 coupled between the Q27 base and ground.

Charge Transfer Circuit 110

To remove and preserve the charge developed on speed normalizing capacitor $C_N$ during each FF1 or FF1* interval, charge transfer circuit 110 comprises an enabling circuit comprising NPN transistors Q33 and Q34, a pair of PNP current source transistors Q31 and Q35, a pair of differentially connected PNP transistors Q28 and Q29, and an NPN discharge transistor Q30. The emitters of the differential pair Q28 and Q29 are commonly connected to the collector of the PNP current source Q35, the emitter of which is connected to B+ through biasing resistor R36. The Q28 base is connected to the non-grounded terminal of the normalizing capacitor $C_N$, and the Q29 base is connected to both the non-grounded terminal of roughness output capacitor $C_R$ and the collector of discharge transistor Q30, the emitter of which is grounded and the collector of which is coupled to the Q28 collector. The Q30 collector is also connected to the collector of current source transistor Q31 the emitter of which is coupled to B+ through biasing resistor R44.

To normally disable the charge transfer circuit 110, current source transistors Q35 and Q31 are normally biased OFF by the voltage coupled to the Q35 and Q31 bases respectively through diodes D15 and D16, the cathodes of which are connected to the nodes between a pair of voltage dividing resistors R40 and R46 themselves coupled in series between B+ and ground. The cathodes of diodes D15 and D16 are also coupled to the collector of transfer circuit enabling transistor Q34, the emitter of which is grounded and the collector of which is biased to B+ through resistor R40. The Q34 base is coupled by a coupling resistor R45 to the collector of a normally ON transistor Q33, the emitter of which is grounded, the collector of which is also coupled to B+ through coupling resistor R39, and the base of which is coupled to the node between a pair of voltage dividing resistor R37 and R38, themselves coupled in series between B+ and ground. Also coupled to the Q33 base is one terminal of a capacitor C6 the other terminal of which is coupled to the Q26 base and also to the A and B outputs of comparators 60 and 70 through resistor R35 and diode D11.

Upon the fall of an A or B output pulse from comparators 60 or 70, capacitor C6 produces a negative going pulse on the base Q33, momentarily turning Q33 OFF and Q34 ON. The current source transistors Q35 and Q31 are thereby momentarily turned ON as their respective bases are coupled to ground through respective diodes D15 and D16 and the Q34 collector-to-emitter junction. When Q31 is turned ON, charge therethrough is entered on roughness output capacitor $C_R$ until the voltage thereon rises to that which has been previously entered on speed normalizing capacitor $C_N$ during the previous contiguous FF1 or FF1* interval. When the charge entered on capacitor $C_R$ slightly exceeds that existing on capacitor $C_N$, transistor Q28 conducts to turn ON discharge transistor Q30 to discharge capacitor $C_R$ through the collector-to-emitter junction of Q30 until the voltage on capacitor $C_R$ equals that on capacitor $C_N$.

While the above described preferred embodiment selectively enables the charge transfer circuit 110 only momentarily in accordance with the parameters of differentiating capacitor C6, it will be obvious to one skilled in the art that the A or B output of comparators 60 and 70 could be coupled directly to the base of enabling transistor Q34 to thereby enable the charge transfer circuit 110 for the entire duration of an A or B output pulse.

RECAPITULATION

Roughness sensor means are disclosed for detecting and measuring the cycle-to-cycle changes in the speed of an internal combustion engine. The sensor comprises engine speed sensor means 10 and 20 connectable to be responsive to an engine event recurring each engine cycle to produce therein a signal comprising first and second alternating contiguous states FF1 and FF1* separated by first and second transitions therebetween defining first and second intervals each of which intervals varies with the instantaneous engine speed.

Also provided are first and second content storage means $C_A$ an $C_B$ adapted to store contents increasing from a start value to a peak value and thereafter decreasing from the peak value to a lower value.

Content increasing and decreasing means 40 and 50 are operatively connected to the engine speed sensor means 10 and 20 and to the first and second content storage means $C_A$ and $C_B$. The content increasing and decreasing means 40 and 50 are operative for the entire length of one of the first and second intervals to increase the contents of one of the first and second storage means from a start value established therein at the first transition to a peak value established at the second transition and to simultaneously decrease the contents of the other of the first and second storage means from a second peak value established therein at the first transition. The content increasing and decreasing means 40 and 50 are also operative during the contiguous other of the first and second intervals to decrease the contents of the one of the first and second storage means from the first peak value towards the first start value and to simultaneously increase the content of the other of the first and second storage means from a second start value established at the second transition to a second peak value established at a subsequent first transition.

The roughness sensor further comprises first and second comparator means 60 and 70 coupled respectively to the first and second storage means $C_A$ and $C_B$ and operative to produce first and second output signals A and B each having a width equal to the difference between the time that the contents of a respective storage means has decreased to its corresponding start value occurring in the interval in which the contents of the storage means are decreased and the end of that interval.

Exclusive OR means 80 are coupled to the comparator means 60 and 70 passing one of the first and second output signals A or B only if one output signal and not both or neither are present.

Speed normalization means 90 are coupled to the exclusive OR means 80 and the first and second storage means $C_A$ and $C_B$ and are operative to modify the A or B outputs of the comparators 60 or 70 coupled to the one of the first and second storage means in accordance with the contents of the other of the first and second storage means.

Having described one embodiment of my invention, it is understood that the specific terms and examples are employed in a descriptive sense only and not for the purposes of limitation. Other embodiments of the invention, modification thereof, and equivalent alternatives thereto will be obvious to those skilled in the art and may be made without departing from the true spirit and scope of my invention. For example, as an equivalent alternative to the above-described analog embodiment of the invention, a digital equivalent thereto is contemplated using a pair of multiple-stage up-down counters alternatively and complementarily counted up and down for contiguous intervals varying in width with engine speed. The clock count differences in successive intervals may then be processed by suitable logic to pass only those differences representing the desired roughness information which may then be compared to and modified by actual speed to provide a signal suitable for control purposes.

I therefore aim in the appended claims to cover such modifications, changes, and equivalents which are within the true scope and spirit of my invention.

I claim:

1. Roughness sensor means for detecting and measuring the cycle-to-cycle changes in engine speed comprising:
   (a) engine speed sensor means adapted to respond to an engine event recurring each engine cycle to produce therein an alternating signal comprising first and second transitions defining first and second contiguous intervals therebetween varying directly with the periods of each cycle;
   (b) content storage means coupled to said engine speed sensor means operative to store contents representing the width of at least one of said first and second intervals;
   (c) comparator means coupled to said content storage means operative to compare the widths of said first and second intervals to produce an output pulse having a magnitude determined by the difference between said first and second intervals; and,
   (d) speed normalization means coupled to said content storage means and said comparator means operative to modify said magnitude of said comparator output to produce a roughness signal varying directly with said comparator output and inversely with said contents.

2. The apparatus of claim 1 including utilization means and wherein said speed normalization means comprises comparator output transmission rate variation means coupling said content storage means and said comparator means operative to vary the rate of transmission of said comparator output signal to said utilization means inversely with said contents, whereby said transmission rate deceases to decrease said roughness signal with increasing contents of said content storage means.

3. The apparatus of claim 2 wherein said utilization means comprises one of a capacitor means and a digital counter means.

4. Roughness sensor means for detecting and measuring the cycle-to-cycle changes in the speed of an internal combustion engine comprising:
   (a) engine speed sensor means connectable to be responsive to an engine event recurring each engine cycle to produce therein a signal comprising first and second alternating contiguous states separated by first and second transitions therebetween defining first and second intervals each of which varies with the instantaneous engine speed;
   (b) first and second content storage means adapted to store contents increasing from a starting value to a peak value and thereafter decreasing from said peak value to a lower value;
   (c) content increasing and decreasing means operatively connected to said engine speed sensor means and said first and second content storage means, said content increasing and decreasing means operative for the entire length of one of said first and second intervals to increase the content of one of said first and second storage means from a start value established therein at said first transition to a peak value established at said second transition and to simultaneously decrease the contents of the other of said first and second storage means from a second peak value established therein at said first transition, said content increasing and decreasing means being further operative during said contiguous other of said first and second intervals to decrease the contents of said one of said first and second storage means from said first peak value towards said first start value and to simultaneously increase the contents of the other of said first and second storage means from a second start value established at said second transition to a second peak value established at a contiguous next first transition;

(d) first and second comparator means coupled respectively to said first and second storage means operative to produce first and second output signals each having a width equal to the difference to the time that the contents of a respective storage means has decreased to its corresponding start value occurring in the interval in which the contents of said storage means are decreased and the time of said next first transition;

(e) exclusive OR means coupled to said comparator means for passing one of said first and second output signals only if said one output signal and not both or neither are present; and, (f) speed normalization means coupled to said exclusive OR means and said first and second storage means operative to modify said output of said comparator coupled to one of said first and second storage means in accordance with the contents of the other of said first and second storage means.

5. Roughness sensor means for detecting and measuring the instantaneous changes in engine speed comprising:

(a) engine speed sensor means adapted to respond to an engine event recurring at least once each engine cycle to produce an alternating signal comprising first and second transitions defining first and second contiguous intervals therebetween each interval having a duration determined by the instantaneous engine speed;

(b) comparator means operative to compare the durations of said first and second intervals to produce an output pulse having a width determined by the difference therebetween; and (c) roughness output means coupled to said comparator means for producing a roughness signal only when said output pulse is produced during one of said first and second intervals and not the other.

6. The roughness sensor of claim 5 wherein said roughness output means comprises EXCLUSIVE OR logic means.

7. The roughness sensor of claim 5 including:
speed normalization means coupled to said engine speed sensor means and said comparator means operative to utiize the duration of one of said first and second intervals to produce a normalized roughness output signal.

8. The roughness sensor of claim 7 wherein said normalized roughness signal varies with difference in the first and second intervals divided by the first interval.

9. Roughness sensor means for detecting and measuring the changes in the instantaneous speed of an internal combustion engine at least once each cycle comprising:

(a) engine speed sensor means connectable to be responsive to an engine event recurring at least once each engine cycle to produce a signal comprising first and second alternating contiguous states separated by first and second transitions therebetween defining first and second intervals, each said interval having a duration determined by the instantaneous engine speed;

(b) first and second content storage means coupled to said engine speed sensor means adapted to store contents increasing with the respective durations of said first and second intervals;

(c) comparator means coupled to said engine speed sensor means and said first and second content storage means for comparing said contents and providing a difference signal varying directly with the difference in said contents; and (d) roughness output means coupled to said comparator means for generating a roughness signal only when said difference signal is produced during one of said first and second intervals and not the other.

10. The roughness sensor of claim 9 wherein each of said contents storage means comprises one of a capacitor means and a digital counter means.

11. The roughness sensor of claim 9 wherein said roughness output means comprise EXCLUSIVE OR logic means.

12. Roughness sensor means for detecting and measuring the changes in the instantaneous speed of an internal combustion engine at least once each cycle comprising:

(a) engine speed sensor means connectable to be responsive to an engine event recurring at least once each engine cycle to produce a signal comprising first and second alternating contiguous states separated by first and second transitions therebetween defining first and second intervals each of which varies with the instantaneous engine speed;

(b) first and second content storage means adapted to store contents increasing from a starting value to a peak value and thereafter decreasing from said peak value to a lower value;

(c) content increasing and decreasing means operatively connected to said engine speed sensor means and said first and second content storage means, said content increasing and decreasing means operative for the entire length of one of said first and second intervals to increase the contents of one of said first and second storage means from a start value established therein at said first transition to a peak value established at said second transition and to simultaneously decrease the contents of the other of said first and second storage means from a second peak value established therein at said first transition, said content increasing and decreasing means being further operative during said contiguous other of said first and second intervals to decrease the contents of said one of said first and second storage means from said first peak value towards said first start value and to simultaneously increase the contents of the other of said first and second storage means from a second start value established at said second transition to a second peak value established at a contiguous next first transition;

(d) first and second comparator means coupled respectively to said first and second content storage means operative to produce first and second output signals each having a width commencing when the contents of a respective storage means have decreased to its corresponding start value and terminating at the next transition;

(e) exclusive Or means coupled to said comparator means for passing one of said first and second output signals only if said one output signal and not both or neither are present; and, (f) speed normalization means coupled to said exclusive OR means and said first and second storage means operative to modify said output of said comparator coupled to one of said first and second storage means in accordance with the contents of the other of said first and second storage means.

* * * * *